United States Patent
Reynolds et al.

(10) Patent No.: US 8,956,761 B2
(45) Date of Patent: Feb. 17, 2015

(54) LITHIUM ION BATTERY AND METHOD FOR MANUFACTURING OF SUCH BATTERY

(75) Inventors: Glyn Jeremy Reynolds, Largo, FL (US); Robert Mamazza, Jr., New Port Richey, FL (US)

(73) Assignee: Oerlikon Advanced Technologies AG, Balzers, Liechtenstein (*) Notice: Subject to any disclaimer, the term of this patent is extended or adjusted under 35 U.S.C. 154(b) by 221 days.

(21) Appl. No.: 13/512,558

(22) PCT Filed: Nov. 30, 2010

(86) PCT No.: PCT/US2010/058275
§ 371 (c)(1),
(2), (4) Date: Jul. 11, 2012

(87) PCT Pub. No.: WO2011/066518
PCT Pub. Date: Jun. 3, 2011

(65) Prior Publication Data
US 2012/0270114 A1    Oct. 25, 2012

Related U.S. Application Data

(60) Provisional application No. 61/264,974, filed on Nov. 30, 2009.

(51) Int. Cl.
*H01M 4/13* (2010.01)
*H01M 10/052* (2010.01)
(Continued)

(52) U.S. Cl.
CPC .......... *H01M 10/052* (2013.01); *H01M 4/0402* (2013.01); *H01M 4/0426* (2013.01);
(Continued)

(58) Field of Classification Search
CPC .......... H01M 10/0436; H01M 10/052; H01M 10/0525; H01M 10/0562; H01M 10/0585; H01M 10/38; H01M 2300/0022; H01M 4/13; H01M 4/0402; H01M 4/0404; H01M 4/0407; H01M 4/0421; H01M 4/0423
USPC .............. 429/304, 209, 218.1, 231.5, 231.95, 429/251
See application file for complete search history.

(56) References Cited

U.S. PATENT DOCUMENTS 4,002,492 A * 1/1977 Rao ............................... 429/337
4,405,416 A * 9/1983 Raistrick et al. .............. 205/407
(Continued)

FOREIGN PATENT DOCUMENTS

| WO | WO 00/60689 | 10/2000 |
| WO | WO 2008/153564 | 12/2008 |

OTHER PUBLICATIONS

West, W.C., Whitacre, J.F., & Lim, J.R., "Chemical Stability Enhancement of Lithium Conducting Solid Electrolyte Plates Using Sputtered LiPON Thin Films," J. Power Sources, 126, 134-138 (2004).

(Continued)

*Primary Examiner* — Patrick Ryan
*Assistant Examiner* — Ben Lewis
(74) *Attorney, Agent, or Firm* — Ohlandt, Greely, Ruggiero & Perle, LLP

(57) ABSTRACT

The present invention provides an electrochemical cell comprising an anodic current collector in contact with an anode. A cathodic current collector is in contact with a cathode. A solid electrolyte thin-film separates the anode and the cathode.

16 Claims, 4 Drawing Sheets

(51) Int. Cl.
*H01M 4/04* (2006.01)
*H01M 4/139* (2010.01)
*H01M 4/66* (2006.01)
*H01M 6/40* (2006.01)
*H01M 10/04* (2006.01)
*H01M 10/0562* (2010.01)
*H01M 10/0585* (2010.01)
*H01M 10/0525* (2010.01)

(52) U.S. Cl.
CPC ............... *H01M 4/13* (2013.01); *H01M 4/139* (2013.01); *H01M 4/661* (2013.01); *H01M 6/40* (2013.01); *H01M 10/0436* (2013.01); *H01M 10/0562* (2013.01); *H01M 10/0585* (2013.01); *H01M 4/0407* (2013.01); *H01M 4/0404* (2013.01); *H01M 10/0525* (2013.01); *H01M 2300/0022* (2013.01); *Y02E 60/122* (2013.01); *Y02T 10/7011* (2013.01)
USPC ... 429/231.95; 429/304; 429/209; 429/218.1; 429/231.5; 429/251

(56) References Cited

U.S. PATENT DOCUMENTS

| | | | |
|---|---|---|---|
| 4,528,253 A | | 7/1985 | McManis et al. |
| 5,230,712 A | * | 7/1993 | Matthews ................ 29/25.03 |
| 5,350,645 A | * | 9/1994 | Lake et al. ............... 429/124 |
| 5,445,906 A | * | 8/1995 | Hobson et al. ............ 429/162 |
| 6,168,884 B1 | | 1/2001 | Neudecker et al. |
| 2002/0001747 A1 | * | 1/2002 | Jenson et al. ............ 429/162 |
| 2003/0175585 A1 | * | 9/2003 | Ugaji et al. .............. 429/162 |
| 2004/0018424 A1 | * | 1/2004 | Zhang et al. ............. 429/162 |
| 2004/0151986 A1 | * | 8/2004 | Park et al. ............... 429/322 |
| 2007/0184345 A1 | | 8/2007 | Neudecker et al. |
| 2008/0176142 A1 | * | 7/2008 | Inagaki et al. ........... 429/330 |
| 2008/0286649 A1 | * | 11/2008 | Li et al. .................. 429/188 |
| 2009/0045053 A1 | * | 2/2009 | Kim et al. .............. 204/298.13 |

OTHER PUBLICATIONS

Liang, C.C., Epstein, J., Boyle, G.H., "A High Voltage, Solid-State Battery System," J. Electrochem. Soc., 116, 1452 (1969).

Nuedecker, B., "Volume PVD Manufacturing of Recharcheable Thin-Film Batteries", papare presented at SEMICON West 2008 Emerging Markets TechXPOT, Jul. 15-17, 2008, San Francisco, CA.

Ruffo, R., Hong, S.S., Chan, C.K., Huggens, R.A., and Cui, Y., "Impedance Analysis of Silicon Nanowire Lithium Ion Battery Anodes," J. Phys. Chem. C. 113, 11390-11398 (2009).

International Bureau, International Search Report for International Application No. PCT/US2010/058275, Jun. 03, 2011, pp. 1-4, Geneva, Switzerland.

International Bureau, Written Opinion of the International Search Authority for International Application No. PCT/US2010/058275, May 31, 2012, pp. 1-4, Geneva, Switzerland.

International Bureau, International Preliminary Report on Patentability Chapter I for International Application No. PCT/US2010/058275, Jun. 5, 2012, pp. 1-5, Geneva, Switzerland.

* cited by examiner

LITHIUM ION BATTERY AND METHOD FOR MANUFACTURING OF SUCH BATTERY

CROSS-REFERENCE TO RELATED APPLICATIONS

This application is a United States national stage entry of International Application serial no. PCT/US2010/058275 filed Nov. 30, 2010, which claims priority to U.S. provisional patent application Ser. No. 61/264,974 filed Nov. 30, 2009. The contents of both of these prior applications are incorporated herein by reference in their entirety as if set forth verbatim.

FIELD

This invention relates to the field of electrical energy storage and is particularly related to fabricating high specific energy, high specific power rechargeable electrochemical cells for mobile electronic device, automotive and renewable energy applications.

BACKGROUND

Over the past several decades, the number of portable electronic devices has increased dramatically. Concomitantly, there has been a need to provide lighter, rechargeable power sources with increased electrical storage capacity. Although there have been many technological improvements in the fields of photovoltaic cells, fuel cells and supercapacitors, electrochemical storage in the form of a single or multiple electrochemical cells ("batteries") is still the preferred means to provide power to most portable electronic devices. Electrochemical cells provide an excellent combination of energy capacity, power density and economy. Of the many rechargeable electrochemical cells available in the market today, lithium batteries offer the best performance in terms of specific energy and specific power. At present, the most common rechargeable lithium batteries in use in portable electronic devices are lithium-ion batteries. Lithium-ion batteries combine intercalation electrodes with a non-aqueous liquid electrolyte. Most lithium-ion batteries available today use carbon anodes and cathodes fabricated from metal oxides, phosphates, sulfides or oxysulfides. Another common form of lithium battery in use today is the lithium polymer battery. Instead of a non-aqueous liquid electrolyte, the lithium polymer battery uses a polymeric electrolyte, as its name implies. Some lithium polymer batteries use lithium metal anodes, but the majority use similar electrode materials to lithium-ion batteries.

Lithium-ion and lithium polymer batteries provide premium battery performance at a premium price. However, for many applications, the number of charge-discharge cycles that they can undergo is insufficient. While the cycle life of a capacitor is often measured in millions of cycles, typical cycle lives for lithium-ion and lithium polymer batteries are measured in hundreds of cycles. For applications where large, expensive batteries are required, for example, in all-electric or hybrid-electric vehicles and to back up solar or wind power installations, the cost/lifetime ratio for lithium-ion and lithium polymer batteries is too high. Though some reduction in cost can be achieved by using less expensive materials (such as substituting lithium iron phosphate for the more expensive lithium cobalt oxide cathode material), a way to increase cycle life must be found if lithium batteries are to play a significant role in these large and growing markets.

Another concern often expressed about lithium-ion batteries is their less-than-perfect safety record: there have been a number of highly publicised product recalls associated with "defective" lithium-ion batteries and there are sporadic reports of exploding lithium-ion batteries. These concerns must be addressed and overcome before lithium-ion batteries can be considered for safety-critical applications, e.g., the automotive industry.

Although lithium-ion and lithium polymer batteries have limited charge-discharge cycle lives, another kind of rechargeable lithium battery, the so-called thin-film lithium battery, has a typical cycle life that is measured in thousands of cycles. These thin-film lithium cells comprising thin-film electrodes, electrolytes and current collectors deposited by physical vapor deposition (PVD) onto a substrate have undergone over 20,000 charge/discharge cycles without significant loss of capacity. See W. C. West, J. F. Whitacre and J. R. Lim, "Chemical stability enhancement of lithium conducting solid electrolyte plates using sputtered LiPON thin films", *J. Power Sources*, 126, 134-138 (2004). Though thin-film lithium batteries date back to 1969 (see C. C. Liang, J. Epstein and G. H. Boyle, "A High-Voltage, Solid-State Battery System", *J. Electrochem. Soc.*, 116, 1452 (1969)), this type of battery received much attention when John Bates and his group at Oak Ridge National Laboratory discovered the 'LiPON' thin-film electrolyte material in 1994. In contrast to many of the oxide and sulfide based thin-film electrolytes used previously, UPON was stable to metallic lithium and also to cathode materials that exhibited potentials of up to ~5V versus lithium anodes. It rapidly became the standard solid electrolyte material for thin-film lithium batteries. However, to date, thin-film lithium batteries have yet to find widespread acceptance as energy storage devices. This is primarily due to their very limited energy storage capacity per unit area and the very high cost to make them.

It is difficult to deposit thin-films greater than about 10 microns thick by PVD. The stresses that build up in the thin-films during deposition can cause the films to delaminate or spall from the substrate. For a 10 micron thick cathode fabricated from $LiCoO_2$, a favorite high-performance thin-film cathode material, the theoretical cell capacity is limited to ~0.8 mA-h cm$^{-2}$, based on a film density of 5 g cm$^{-3}$ and the ability to cycle 60% of the Li in $LiCoO_2$. In practice, this probably represents an upper limit for a single thin-film electrochemical cell based on $LiCoO_2$ as 10 micron thick films deposited by PVD are usually significantly less than 100% dense. In U.S. Pat. No. 6,168,884, Neudecker et al. cite a capacity for a thin-film lithium battery with a 1 micron thick $LiCoO_2$ cathode of 69 µA-h cm$^{-2}$ which correlates well with this estimate. See B. J. Neudecker, N. J. Dudney and J. B. Bates, "Battery with an In-Situ Activation Plated Lithium Anode", U.S. Pat. No. 6,168,884. Typically, the cost to sputter deposit metal films is ≥0.25 U.S. cents per micron per cm$^2$. To deposit the cathode film alone for a thin-film lithium battery based on $LiCoO_2$ would cost ~$8,000 per kW-h, which is many orders of magnitude above the targeted figure of $150 per kW-h for automotive and other large energy storage applications. As a result, thin-film lithium batteries must be fabricated using much less expensive thin-film deposition techniques or they will be limited to high-end niche applications with very modest capacity requirements.

OBJECTS OF THE INVENTION

Based on the limitations of the prior art, there is a need for an improved Lithium Ion Battery.

Nothing in the prior art provides the benefits attendant with the present invention. Therefore, it is an object of the present invention to provide an improvement which overcomes the inadequacies of the prior art.

Another object of the present invention is to provide an electrochemical cell comprising: an anodic current collector in contact with an anode; a cathodic current collector in contact with a cathode; and a solid electrolyte thin-film separating said anode and said cathode.

Yet another object of the present invention is to provide a method for fabricating a lithium battery comprising: providing a substrate; coating said substrate with a cathodic current collector; depositing a cathode onto said cathodic current collector; applying a heat treatment to the substrate after said deposition of said cathode; and depositing an anodic current collector onto said cathode after said heat treatment step.

Still yet another object of the present invention is to provide a method for fabricating a lithium battery comprising: providing a substrate; coating said substrate with a cathodic current collector; placing said substrate with said cathodic current collector into a vacuum processing system; depositing a thin layer of cathode material onto said cathodic current collector in a first processing station of said vacuum processing system; transferring under vacuum said substrate with said cathode material to a second processing station within said vacuum processing system; depositing a thin film of a solid electrolyte material onto said cathode material in said second processing station of said vacuum processing system; transferring under vacuum said substrate with said solid electrolyte material to a third processing station within said vacuum processing system; depositing a thin layer of anode material onto said solid electrolyte material in said third processing station of said vacuum processing system; removing said substrate with said anode material from said vacuum processing system; depositing an anode onto said anode material; and depositing an anodic current collector onto said anode.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY

The current invention describes a method for fabricating a lithium battery that overcomes the inherent cycle life and safety issues associated with today's lithium-ion and lithium polymer batteries without incurring the excessive fabrication costs that limit the applications for thin-film lithium batteries. A suitable substrate is coated with a cathodic current collector using one of several inexpensive thick film techniques. The cathode is then fabricated from active electrode material, solid-electrolyte material and an electronic conductor such as high surface area graphite and deposited onto the substrate using an inexpensive thick film deposition technique. After suitable heat treatment to drive off any unwanted liquids or vapors, the cathode is introduced into a vacuum deposition system where first, a thin layer of cathode material is deposited. Without breaking vacuum, the substrate is transferred into a processing station where a thin film of a solid electrolyte such as lithium phosphorus oxynitride (LiPON) is deposited. Once again, without breaking vacuum, the substrate is transferred into a processing station where a thin layer of anode material such as lithium, a lithium alloy, carbon or silicon is deposited. The substrate is then removed from the vacuum deposition system and the anode is deposited by inexpensive thick film techniques. In some embodiments, the step to deposit the thick film anode is not required. Finally, an anodic current collector is deposited by inexpensive thick film techniques.

A feature of the present invention is to provide an electrochemical cell comprising an anodic current collector in contact with an anode. The anodic current collector can further comprise a metal selected from the group consisting of iron, nickel, cobalt, chromium, molybdenum, tungsten and their alloys. The anode can further comprise lithium metal or a lithium alloy. The lithium alloy can be selected from the group consisting of lithium-carbon alloys, lithium-aluminum alloys, lithium-tin alloys, lithium-silicon alloys, lithium-germanium alloys, lithium-magnesium alloys, lithium-indium alloys and lithium-gallium alloys. The anode can further comprise lithium-containing oxides, lithium-containing sulfides or lithium-containing selenides. A cathodic current collector is in contact with a cathode. The cathodic current collector can be a metal where the metal can be resistant to oxidation. The metal for the cathodic current collector can be selected from the group consisting of nickel, gold, platinum, rhodium, palladium, iridium and aluminum. The cathode can be lithium cobalt oxide or lithium iron phosphate. A solid electrolyte thin-film separates the anode and the cathode. The solid electrolyte can be LiPON. The solid electrolyte can be selected from the group consisting of LiPONB, $Li_{3.6}Si_{0.6}P_{0.4}O_4$, $Li_{6.1}V_{0.61}Si_{0.39}O_{5.36}$, $LiBO_2$, LiBP, $Li_2SO_4$—$Li_2O$—$B_2O_3$, $Li_2S$—$SiS_2$—$P_2S_5$ and LiI—$Li_2S$—$P_2S_5$—$P_2O_5$. The solid electrolyte can be a molten salt electrolyte. The solid electrolyte can be a eutectic mixture of lithium nitrate and potassium nitrate. The eutectic mixture can have a melting point of about 133° C. The eutectic mixture can further comprise oxidizing species selected from the group consisting of nitrites, borates, sulfates, phosphates and other nitrates. The solid electrolyte can have a thickness of less than or equal to 2 microns.

Another feature of the present invention is to provide a method for fabricating a lithium battery comprising the following steps. A substrate is provided. The substrate is coated with a cathodic current collector. A cathode is deposited onto the cathodic current collector. The depositing of the cathode can further comprise depositing an active electrode material, depositing a solid electrolyte material, and depositing an electronic conductor. The cathode can be densified by simultaneously applying heat and pressure to the cathode. The densification can occur at a temperature higher than a softening point of the solid electrolyte material. A surface of the cathode can be planarized after densification. The depositing of the active electrode material can further comprise mixing nanopowders of the active electrode material with lithium nitrate and potassium nitrate. A graphite powder can be added to the mixture. The solid electrolyte material can be LiPON, that can be deposited as a thin-film using radio-frequency physical vapor deposition from a lithium phosphate target in an ambient containing nitrogen gas. A heat treatment is applied to the substrate after the deposition of the cathode. An anodic current collector is deposited onto the cathode after the heat treatment step. An anode can be attached onto the anodic current collector. The anode can further comprise placing lithium foil in contact with the anodic current collector. The anode can further comprise pouring molten lithium onto the anodic current collector. The anodic current collector can be selected from the group consisting of a metal foil, a metal container, a metal film and a combination thereof. The method can further comprise hermetically sealing the lithium battery.

In a preferred embodiment, the substrate coated with the cathodic current collector can be loaded into a vacuum load lock. The vacuum load lock can be evacuated. Then, the substrate can be transferred to a first deposition chamber where the active electrode material can be deposited. Next, the substrate with the deposited active electrode material can be transferred to a second deposition chamber where the solid electrolyte material can be deposited. Next, the substrate with the deposited solid electrolyte material can be transferred to a third deposition chamber where the electronic conductor can be deposited. Next, the substrate with the deposited electronic conductor can be transferred to the vacuum load lock where the substrate can be removed from the vacuum load lock.

Yet another feature of the present invention is to provide a method for fabricating a lithium battery comprising the following steps. A substrate is provided. The substrate is coated with a cathodic current collector. The substrate with the cathodic current collector is placed into a vacuum processing system. A thin layer of cathode material is deposited onto the cathodic current collector in a first processing station of the vacuum processing system. The substrate with the cathode material is transferred under vacuum to a second processing station within the vacuum processing system. A thin film of a solid electrolyte material is deposited onto the cathode material in the second processing station of the vacuum processing system. The substrate with the solid electrolyte material is transferred under vacuum to a third processing station within the vacuum processing system. A thin layer of anode material is deposited onto the solid electrolyte material in the third processing station of the vacuum processing system. The substrate with the anode material is removed from the vacuum processing system. An anode is deposited onto the anode material. Lastly, an anodic current collector is deposited onto the anode.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Similar reference characters refer to similar parts throughout the several views of the drawings.

DETAILED DESCRIPTION

In thin-film lithium batteries where the cathodes are typically ~1 micron in thickness, it is possible to de-intercalate and re-intercalate reversibly ~60% of the lithium ions contained in a thin-film $LiCoO_2$ cathode such that little or no degradation in capacity occurs during charge-discharge cycling—thin-film lithium batteries have been reported to survive over 100,000 charge-discharge cycles under laboratory conditions. For thicker cathodes, it is difficult to access such a high fraction of the lithium content in this manner as the diffusion lengths involved become quite large for solid-state diffusion at ambient temperatures.

In lithium-ion batteries, the cathodes are fabricated to be porous: they soak up the liquid electrolyte which is then in intimate contact with the grains of the active cathode material, thus most long range lithium ion diffusion in the cathode of a lithium-ion battery occurs through the liquid phase. Nevertheless, solid-state diffusion of lithium ions in and out of the grains of cathode material is believed to be rate-limiting for lithium-ion batteries, determining the maximum rate of charge of the batteries and their power density. This mechanism also gives rise to other concerns: the repeated de-intercalation and re-intercalation of lithium into the active cathode material causes volume changes and in some cases, phase changes. Over time, repeated cycling can cause loss of capacity, eventually leading to cell failure. There are few if any reports of lithium-ion batteries surviving 100,000 deep discharge cycles.

Another problem in lithium-ion cells that is believed to be caused by the use of organic liquid electrolytes is the formation of solid electrolyte interface layers between the electrolyte and the electrodes. Because the organic electrolytes used in lithium-ion batteries are rarely thermodynamically stable with respect to the electrode materials, they react and form a mixture of various compounds at the interfaces. Although these layers are often very thin and have a finite conductivity for lithium ions, they are usually not stable over repeated cycling and constitute another potential failure mode for lithium-ion batteries.

Figure 1:
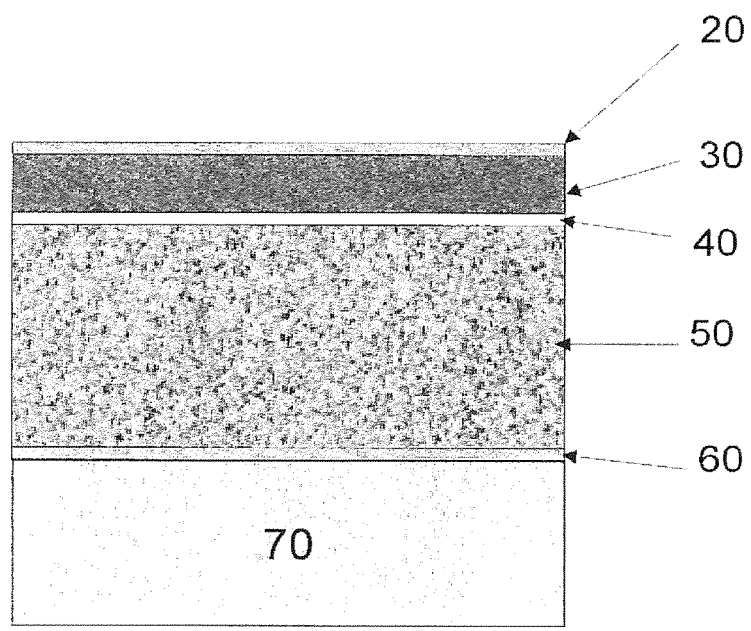
FIG. 1 is a schematic view of a solid-state rechargeable lithium battery according to one embodiment of the present invention.

The present invention differs considerably from lithium-ion batteries in the materials and methods of construction; this is illustrated in FIG. 1. A single electrochemical cell 10 consists of five functional components: an anodic current collector 20 in contact with an anode 30, a cathodic current collector 60 in contact with a cathode 50 and an extremely thin solid electrolyte thin-film 40 that separates the anode 30 and cathode 50. Typically, the anodic current collector 20 is chosen to be a metal that is stable in contact with lithium over the whole operating temperature range of the cell 10. Suitable metals include iron, nickel, cobalt, chromium, molybdenum, tungsten or their alloys. The anode 30 itself should be pure lithium metal or a lithium alloy. Suitable alloys include lithium-carbon alloys, lithium-aluminum alloys, lithium-tin alloys, lithium-silicon alloys, lithium-germanium alloys, lithium-magnesium alloys, lithium-indium alloys and lithium-gallium alloys. Where cell voltage is not a primary concern, other anode materials based on lithium-containing oxides, sulfides and/or selenides are permissible, e.g., $Li_4Ti_5O_{12}$. In a preferred embodiment, the thin-film solid electrolyte 40 is LiPON, prepared by sputtering a lithium phosphate target in a plasma containing nitrogen as practiced by those skilled in the art. Other suitable solid electrolytes include LiPONB, $Li_{3.6}Si_{0.6}Si_{0.4}O_4$, $Li_{6.1}V_{0.61}Si_{0.39}O_{5.36}$, $LiBO_2$, LiBP, $B_2O_3$, $Li_2S$—$SiS_2$—$P_2S_5$ and LiI—$Li_2S$—$P_2S_5$—$P_2O_5$. The stability range of the solid-electrolyte chosen will determine the maximum cell voltage: some of these alternate electrolyte materials are not stable in contact with lithium anodes or strongly oxidizing cathodes such as, for example, $Li_{1-x}CoO_2$. The cathodic current collector 60 is typically chosen to be a metal that is resistant to oxidation, examples being nickel, gold, platinum, rhodium, palladium, iridium and sometimes aluminum. The cathode 50 is described in more detail below. The current collectors are fabricated using inexpensive techniques, such as forming a metal paste and applying it to the appropriate surface at the appropriate stage in battery manufacture. Alternatively, they can be applied using one of several well known and inexpensive thick film deposition techniques or as metal foils pressed tightly against the respective electrode to ensure ohmic contact.

The composite cathode of the present invention combines a known active cathode material, for example, lithium cobalt oxide or lithium iron phosphate, prepared by high temperature synthetic routes known to those skilled in the art, with a solid electrolyte known to be thermodynamically stable (or at least kinetically stable) with the active cathode material over the operating temperature range of the battery. Alternatively, the electrolyte chosen can be a molten salt electrolyte, incorporated into the cathode mixture in either its solid or molten state. In a preferred embodiment, an electrolyte material is chosen that melts below the melting point of the electrodes—when a lithium anode is used (melting point ~180° C.) a suitable electrolyte is a eutectic mixture of lithium nitrate and potassium nitrate with a melting point of ~133° C. However, it is believed that the addition of other oxidizing species such as nitrites, borates, sulfates, phosphates and other nitrates to the lithium nitrate-potassium nitrate eutectic will lower the melting point further. By intimately mixing suitable proportions of nanopowders of the active cathode material, lithium nitrate and potassium nitrate prepared by methods known to those skilled in the art, it is proposed that the effective melting point of the electrolyte incorporated into the composite cathode can be reduced even further. If necessary, the electrical conductivity of the cathode can be enhanced by adding high surface area graphite powder or other forms of high surface area carbon such as carbon nanotubes to the cathode mixture.

The constituents of the cathode should be intimately mixed and prepared in a form consistent with an inexpensive thick film deposition technique including but not limited to screen printing, offset printing, inkjet printing, tape casting, thermal spraying or plasma spraying. For tape casting and the various printing techniques, it is advantageous for the cathode mixture to be in liquid form prior to deposition. The spray techniques mentioned can handle powdered solids. In those instances where the cell will contain a separately deposited anode, it too should be prepared to be in a form consistent with the proposed method by which it will be incorporated into the cell.

Figure 2:
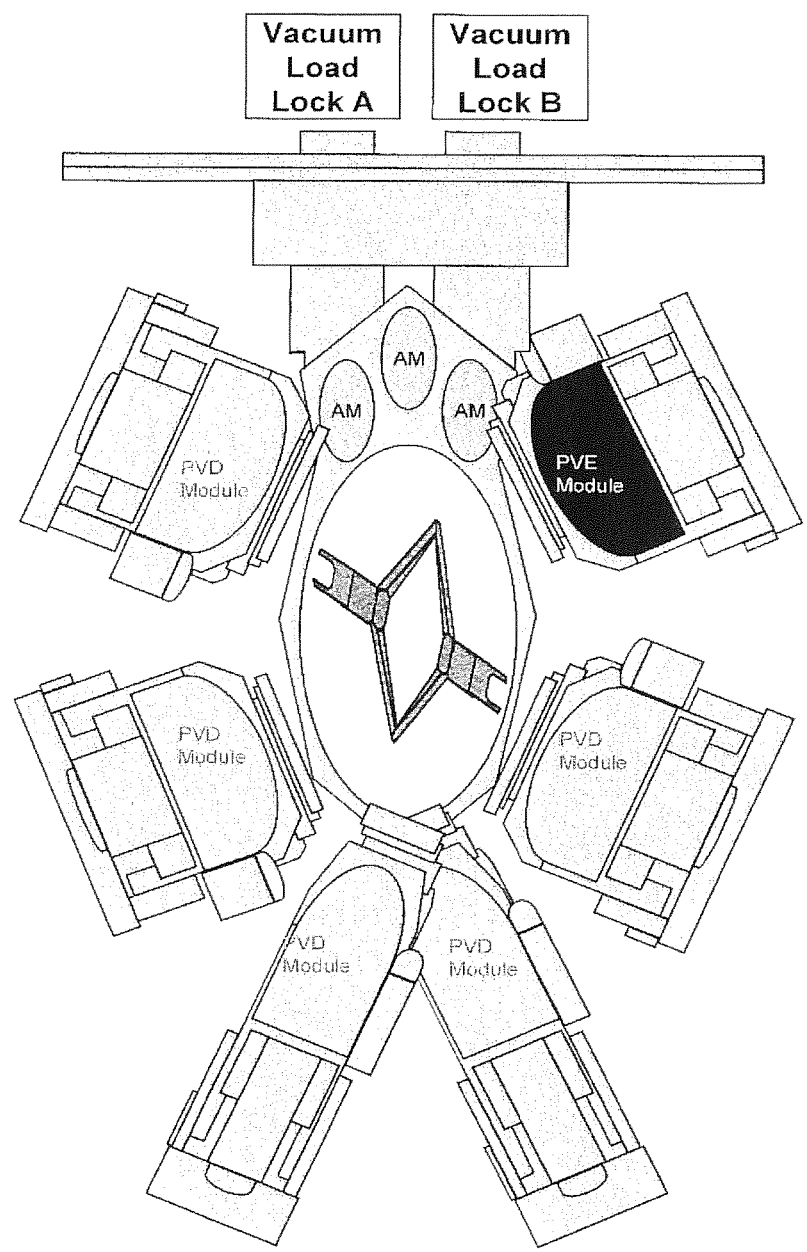
FIG. 2 is a schematic view of a PVD cluster system according to one embodiment of the present invention.

The solid-electrolyte that separates the anode and cathode structures should be as thin as possible, consistent with the ability to deposit a high quality film free of pinholes and other unwanted defects. In a preferred embodiment, the solid-electrolyte itself should be ≤2 microns thick: even thinner is better, as this will lower the cost to manufacture the cell, increase their specific powers significantly and their specific energies slightly. The semiconductor industry demands high quality thin-films with low defect densities and equipment providers have developed tools and processes for this, most notably sputtering, evaporation, chemical vapor deposition (CVD), plasma-enhanced chemical vapor deposition (PECVD), atomic layer deposition (ALD), pulsed laser deposition (PLD), etc. Most of these techniques are carried out in vacuum apparatus: one such example is provided by the Oerlikon ClusterLine (FIG. 2), a modular integrated PVD, CVD and sputter etch tool. In the case of the solid electrolyte material LiPON, it is advantageously deposited as a high quality thin-film using radio-frequency physical vapor deposition (RFPVD) from a lithium phosphate target in an ambient that contains nitrogen gas.

Integrated modular vacuum deposition equipment is especially effective at controlling the quality of interfaces. In order to protect the critical interfaces between the electrolyte and the electrodes, it is desirable to deposit the electrolyte directly onto a high quality vacuum deposited film. Similarly, after the electrolyte is deposited, it is desirable to deposit another high quality vacuum deposited film thereon. This sequence can be readily implemented in a tool such as an Oerlikon ClusterLine as follows: first, the substrate to be coated is introduced into a vacuum load lock which is then evacuated. Optionally, the substrate to be coated can be subjected to heating or sputter etching of its surface prior to thin-film deposition to remove unwanted impurities. In the event the substrate has been coated with a thick film of composite cathode material, the first thin-film deposition step should coat the thick film cathode with additional cathode material. This can be in the form of pure active cathode material, or a combination of active cathode material and solid electrolyte. Sufficient material should be deposited to completely cover the surface of the cathode material deposited by thick film techniques: again, the thinner this layer, the lower the cost to manufacture the cell. Once the thin film electrode material has been deposited, the substrate is transferred to another deposition chamber where a thin film of LiPON or other solid electrolyte material is deposited. Finally, the substrate is transferred to a third deposition station where a thin film of anode material is deposited onto the solid electrolyte. The substrate is then removed from the vacuum deposition equipment and additional anode material is deposited (if required) followed by adding the anodic current collector.

It should be noted that the order of deposition can be reversed: optionally, the anodic current collector can be deposited directly onto the substrate followed by the anode, then the three thin-film depositions in the order anode-electrolyte-cathode, followed by the cathode and finally the cathodic current collector.

Increased productivity of the thin-film deposition steps will be realized if the substrate to be coated has a large surface area. Typically, this requires the depositions to be carried out in equipment designed for flat panel display, architectural glass or thin-film solar cell applications. Alternatively, where the underlying substrate and electrode structure is sufficiently flexible, the thin-film depositions can be performed using a roll-to-roll or web coater.

Unlike the porous cathodes used in lithium-ion batteries, the cathodes used in the all solid-state lithium batteries described here should be as dense as possible to avoid air or gas pockets. After mixing the components in the desired quantities, it is desirable to densify the cathode by simultaneously applying heat and pressure: in this manner, composite cathode pellets close to 100% dense can be prepared. It is advantageous to choose a temperature higher than the softening point of the electrolyte for densification of the cathode. Cathode densification should be carried out in a dry, oxidizing ambient, for example, dry air or oxygen. The densification temperature should not be so high as to cause sintering, decomposition of the active cathode material or reaction between the components of the composite cathode. When high surface area graphite powder is added to the cathode mixture, the upper temperature limit for cathode densification will be ~650° C.—above this temperature, the rate of oxidation of the high surface area graphite will be high.

It is also desirable that the as-deposited thick film cathode be as smooth as possible. This will minimize the thickness of vacuum deposited cathode material required to cover the bulk of the cathode prior to electrolyte deposition. In order to ensure a smooth surface on which to vacuum deposit the thin films, it is possible to planarize the cathode surface after densification using lapping, polishing or chemical-mechanical planarization techniques known to those skilled in the art.

The intimate mixture of active cathode material and electrolyte in the solid-state composite cathode ensures that a high concentration of lithium ions surrounds the small individual grains of active cathode material. Solid-state diffusion in and out of the grains of the active cathode material need not occur over large diffusion lengths. In a preferred embodiment where the electrolyte added to the cathode mixture is a molten salt, the cell can run close to or just above the melting point of the electrolyte (for a lithium nitrate—potassium nitrate eutectic mixture, this would be ~133° C.). Once molten, nitrate salts are known to exhibit very fast lithium ion mobility and have been reported to sustain current densities up to 1,250 mA $cm^{-2}$. See G. E. McManis, III, M. H. Miles and A. N. Fletcher, "High Performance Molten Nitrate Cell", U.S. Pat. No. 4,528,253. This almost two orders of magnitude higher than has been reported for thin-film batteries with a LiPON solid electrolyte. See B. Neudecker, "Volume PVD Manufacturing of Rechargeable Thin-Film Batteries", paper presented at SEMICON West 2008 Emerging Markets TechXPOT, July 15-17 San Francisco, Calif. (2008).

Some of the candidate thin solid electrolyte materials may show a propensity to dissolve in the composite cathode, especially when it contains molten salt electrolyte (for example, lithium phosphate may dissolve in the lithium nitrate—potassium nitrate eutectic). In such instances, a sufficient quantity of the said candidate thin solid electrolyte material should be added to the composite cathode mixture to ensure that the electrolyte contained therein is saturated with this material. In some instances, this will have the desired benefit of lowering the effective melting temperature of the electrolyte in the composite cathode.

After the substrate is fabricated with the cathodic current collector, the composite cathode and the three thin films described earlier (cathode-solid electrolyte-anode) it is necessary to attach the anode to this structure. This can be effected by depositing a thick film of a suitable material directly onto the underlying structure. Alternatively, where the anode is lithium metal, it can be fabricated by placing clean lithium foil in intimate contact with the protective thin-film of anode material in an inert atmosphere and applying pressure (and if necessary, heat) to ensure that the bulk anode is in good electrical contact with the protective thin-film and therefore in good electrical contact with the thin solid electrolyte. Another method to fabricate the bulk anode involves pouring molten lithium onto the protective thin-film with the rest of the cell (thin electrolyte, cathode and cathodic current collector) protected by a suitable fixture: this operation should likewise be carried out in vacuo or in an inert atmosphere. Other methods to fabricate the bulk anode will be apparent to those skilled in the art. Nanocrystalline silicon has recently been reported to be a particularly effective anode material for lithium-ion batteries. See R. Ruffo, S. S. Hong, C. K. Chan, R. A. Huggins and Y. Cui, "Impedance Analysis of Silicon Nanowire Lithium Ion Battery Anodes", J. Phys. Chem. C. 113, 11390-11398 (2009).

Once the bulk anode is fabricated, the anodic current collector is added: this can be a metal foil, a metal container, a metal film or a combination thereof. It is important that good ohmic contact is achieved between the bulk anode and the anodic current collector as the current collector serves as a means to connect the anode to an external circuit or load. In some embodiments, the anodic current collector can be incorporated into the bulk anode material before the anode is attached to the remainder of the cell, for example, lithium foil can be stamped into a cap that forms one component of a button cell. The cap and lithium foil can then be forced into intimate contact with the protective thin-film of anode material on the thin solid electrolyte by the application of suitable pressure, thereby completing the cell fabrication process. In this example, it is important to maintain even pressure over the surface area of the cell at an appropriate level that does not cause the thin electrolyte or the composite cathode to crack.

Once the second current collector is in place, the cell can be removed from the substrate (which, in the interests of economy should be cleaned and re-used), packaged and hermetically sealed in an inert oxygen- and moisture-free environment. It is important to prevent moisture in particular from leaking into the cell, but unlike today's lithium-ion batteries that contain noxious organic liquids and dissolved electrolytes that can leak out if the packaging is damaged, there are no similar concerns associated with the solid state lithium cell described here.

In some embodiments where the active cathode material contains lithium that can be reversibly intercalated, for example, $LiCoO_2$ or $LiFePO_4$, it is not necessary to fabricate a bulk anode. Furthermore, in this case, the thin-film used to protect the thin solid electrolyte need not contain lithium. All the lithium necessary for cell operation is contained in the cathode. On initial charging, lithium migrates from the cathode across the electrolyte to the anode. In the case where the protective thin-film on the thin solid electrolyte does not form an alloy with lithium at the operating temperature of the cell, a lithium anode plates out at the interface between the solid electrolyte and the protective film: in this example, the protective thin-film acts as an actual or virtual anodic current collector. In the case where the protective thin-film on the thin solid electrolyte does form an alloy with lithium at the operating temperature of the cell, the anode formed will be comprised of either: a) a solid-solution of the protective thin-film material dissolved in lithium metal, or b) a two phase mixture of a solid-solution of the protective thin-film material dissolved in lithium metal in equilibrium with an alloy phase that is a compound formed between lithium and the protective thin-film material. Examples of candidate protective thin-film materials that will not alloy with lithium at the operating temperature of the cell include iron, nickel, cobalt, chromium, molybdenum and tungsten. Examples of candidate protective thin-film materials that will alloy with lithium at the operating temperature of the cell include carbon, aluminum, tin, silicon, germanium, magnesium, indium and gallium. This particular cell embodiment is very desirable from the standpoint of cell safety. Because it is fabricated in its fully discharged form, the cell can be handled and transported without the potential for catastrophic energy release in the eventuality that the electrodes are shorted together. Furthermore, the fact that in the as-fabricated state, no metallic lithium is contained in the cell further precludes the hazards associated with cell rupture and the exposure of reactive metallic lithium to the ambient. The safety benefits deriving from the absence of non-aqueous organic liquid electrolytes containing explosive or toxic lithium salts such as are typically used in lithium-ion cells extend to all embodiments of this invention.

The primary advantage of the invention described herein is that it provides the advantages of a thin-film lithium battery, i.e., high cycle life, high specific energy, high specific power and good safety performance at a manufacturing cost per kW-h that is substantially less than can be achieved for conventional thin-film lithium batteries and at only a slight premium over today's lithium-ion batteries. This is possible due to the much lower cost of thick film deposition techniques such as screen printing, offset printing, inkjet printing, tape casting, thermal spraying or plasma spraying compared to thin-film deposition techniques such as PVD. For conventional thin-film lithium batteries, 100% of the battery is fabricated using vacuum deposition techniques. In the invention described herein, only 1-5% of the battery is deposited by expensive vacuum deposition techniques, for example, while a typical thin-film deposition is <10 microns, a typical thick film electrode can be anywhere from a few microns up to a millimeter in thickness. Thicker electrodes are probably best prepared by performing multiple sequential thick film depositions to facilitate densification, though in principle, it is possible to prepare electrodes several millimeters thick in a single step if desired. In such cases, it is probably not strictly accurate to describe the process as "thick film deposition." In cases where the cathode is greater than about 50 microns thick, it can be free standing and the substrate can be dispensed with.

Another advantage of using printing techniques to deposit thick film electrodes is that they can be used to deposit "inks" that contain nanoparticles of active materials. These nanoparticles, by definition <<1 micron in diameter, have very high surface area to volume ratios that can help achieve higher power densities and faster charge rates of the battery.

Figure 3:
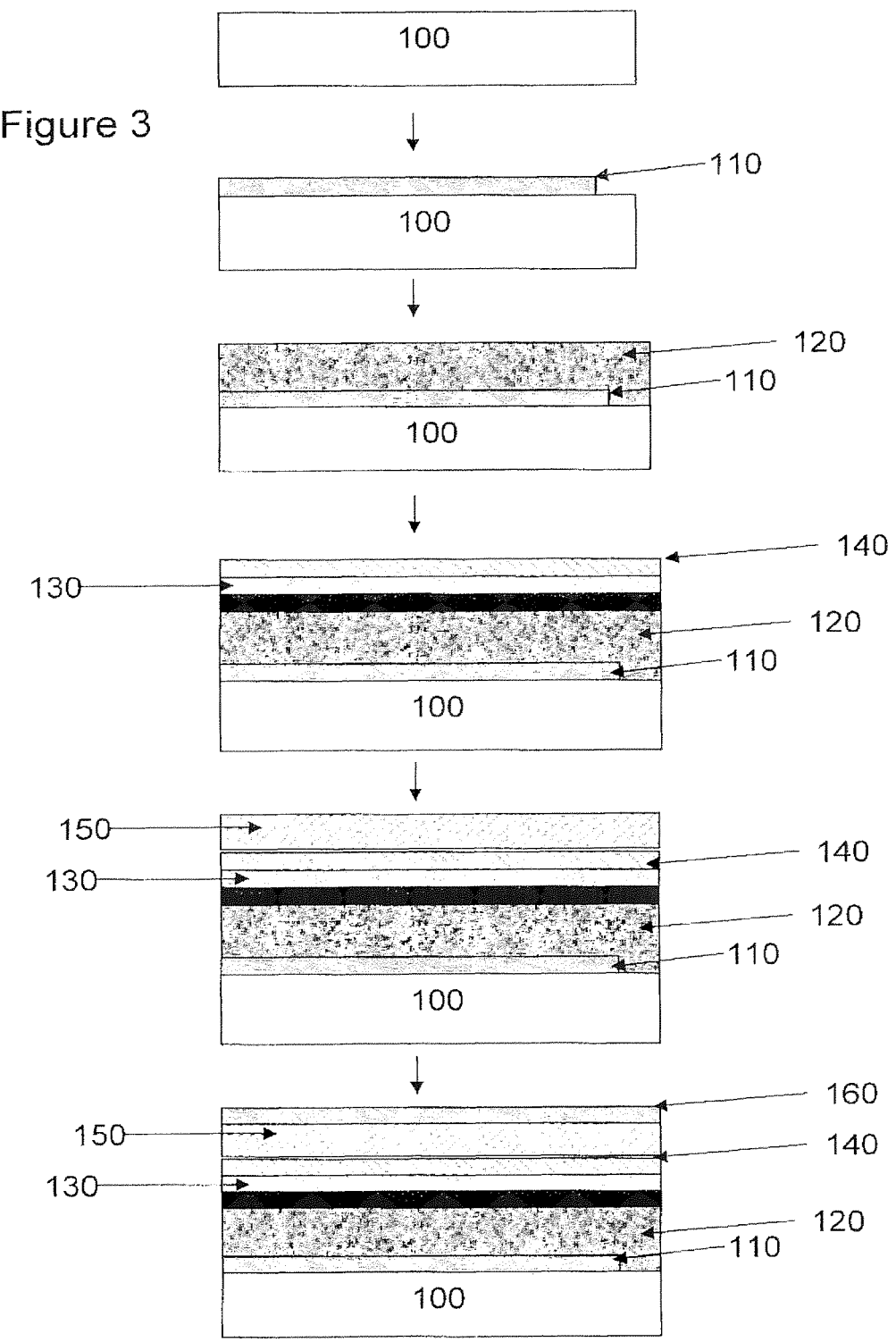
FIG. 3 is a schematic view of a process flow for a single cell fabrication according to one embodiment of the present invention.

It is instructive to consider possible means to fabricate a lithium battery according to the invention described herein—refer to FIG. 3. In step 1, a suitable substrate 100 is coated with a cathodic current collector 110 using one of several inexpensive thick film techniques such as screen printing. The cathode 120 is then fabricated from active electrode material, solid-electrolyte material and an electronic conductor such as high surface area graphite and in step 2 is deposited onto the substrate 100 using an inexpensive thick film deposition technique. After suitable heat treatment to drive off any unwanted liquids or vapors and densify the cathode 120 structure, it is introduced into a vacuum deposition system where next, a thin layer of cathode material is deposited. Without breaking vacuum, the substrate 100 is transferred into a processing station where a thin film of a solid electrolyte 130 such as lithium phosphorus oxynitride (LiPON) is deposited. Once again, without breaking vacuum, the substrate 100 is transferred into a processing station where a thin layer of anode material 140 such as lithium, a lithium alloy, carbon or silicon is deposited. These three sequential thin-film deposition steps are represented by a single step 3 in FIG. 3. The substrate 100 is then removed from the vacuum deposition system and the anode 150 is deposited by inexpensive thick film techniques (step 4). Finally, in step 5, an anodic current collector 160 is deposited by inexpensive thick film techniques.

Figure 4:
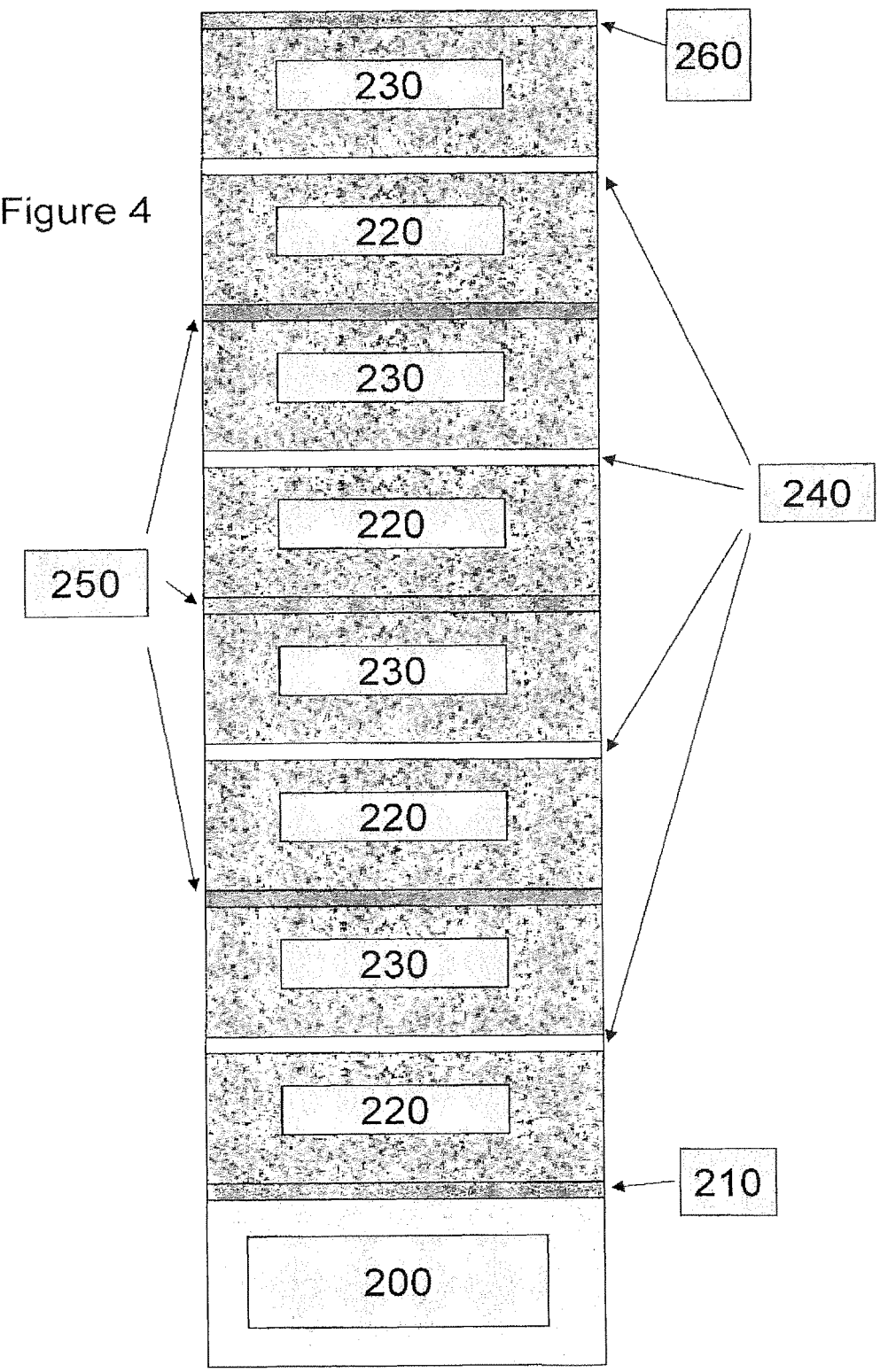
FIG. 4 is a schematic cross-section view of a lithium battery in a bipolar configuration according to one embodiment of the present invention.

In order to achieve higher voltages from lithium or lithium-ion batteries built according to the method described herein, it is possible to build structures where multiple cells are stacked on top of one another in a bipolar configuration (FIG. 4). As shown in FIG. 4, a substrate 200 is optionally provided. A first current collector 210 is provided. Then, a series of a cathode 220, an electrolyte 240, and an anode 230 is deposited with a conductive barrier 250 deposited between each series. Finally, a second current collector 260 is deposited on the final series in the bipolar configuration. It is also conceivable to deposit the structure described herein on a flexible substrate 200 that is wound into a tight spiral and sealed in an appropriate container. Such structures and methods for fabricating them are well known to those skilled in the art.

Hybrid-electric, plug-in electric hybrid and all-electric automobiles applications require batteries with high specific energy, high specific power and low manufacturing cost. It is also important to minimize self-discharge so that the battery does not drain when it is idle for long periods. A lithium or lithium-ion battery fabricated according to the current invention where the cathode mixture contains a low melting molten salt electrolyte is particularly advantageous in such applications. The battery container is equipped with a low wattage heater capable of raising the temperature of the battery above the melting point of the molten salt electrolyte during vehicle operation or battery charging. The power to energize such a heater can be supplied by an inexpensive auxiliary battery such as those used in today's internal combustion engine vehicles for starting, lighting and ignition. With a molten electrolyte, the battery is capable of sustaining very high peak powers, both during operation and while charging. When the vehicle is switched off, the molten salt is allowed to cool, raising the internal impedance of the cell and minimizing self-discharge. With the electrolyte and all the components of the battery in their solid state, unwanted side reactions are minimized, battery lifetime is extended and safety is further increased.

It is understood that the above description is intended to be illustrative and not restrictive. Although various characteristics and advantages of certain embodiments of the present invention have been highlighted herein, many other embodiments will be apparent to those skilled in the art without deviating from the scope and spirit of the invention disclosed. The scope of the invention should therefore be determined with reference to the claims contained herewith as well as the full scope of equivalents to which said claims are entitled.

Now that the invention has been described,
What is claimed is:
1. A method for fabricating a lithium battery comprising:
providing a substrate;
coating said substrate with a cathodic current collector;
mixing nanopowders of an active electrode material with lithium nitrate and potassium nitrate to yield a mixture;
depositing a cathode having said mixture, a solid electrolyte material, and an electronic conductor onto said cathodic current collector;
applying a heat treatment to the substrate after said deposition of said cathode; and
depositing an anodic current collector onto said cathode after said applying heat treatment.
2. The method according to claim 1, further comprising adding graphite powder to said mixture.
3. The method according to claim 1, wherein said solid electrolyte material is LiPON, said LiPON being deposited as a thin-film using radio-frequency physical vapor deposition from a lithium phosphate target in an ambient containing nitrogen gas.
4. The method according to claim 1, further comprising:
loading said substrate coated with said cathodic current collector into a vacuum load lock;
evacuating the vacuum load lock;
transferring said substrate to a first deposition chamber;

depositing said active electrode material in said first deposition chamber;

transferring said substrate with said deposited active electrode material to a second deposition chamber;

depositing said solid electrolyte material in said second deposition chamber;

transferring said substrate with said deposited solid electrolyte material to a third deposition chamber;

depositing said electronic conductor in said third deposition chamber;

transferring said substrate with said deposited electronic conductor to said the vacuum load lock; and removing said substrate from the vacuum load lock.

5. The method according to claim 1, further comprising densificating said cathode by simultaneously applying heat and pressure to said cathode.

6. The method according to claim 5, wherein said densification occurs at a temperature higher than a softening point of said solid electrolyte material.

7. The method according to claim 5, further comprising planarizing a surface of said cathode after densification.

8. The method according to claim 1, further comprising attaching an anode onto said anodic current collector.

9. The method according to claim 8, wherein said anode further comprising placing lithium foil in contact with said anodic current collector.

10. The method according to claim 8, wherein said anode further comprising pouring molten lithium onto said anodic current collector.

11. The method according to claim 1, wherein said anodic current collector is selected from the group consisting of a metal foil, a metal container, a metal film and a combination thereof.

12. The method according to claim 1, further comprising hermetically sealing the lithium battery.

13. A method for fabricating a lithium battery comprising:
a) providing a substrate;
b) coating said substrate with a cathodic current collector using a thick-film technique;
c) coating said substrate with said cathodic current collector with a cathode using a thick-film technique;
d) placing said substrate with said cathodic current collector and said cathode into a vacuum processing system;
e) depositing a thin layer of cathode material onto said cathode in a first processing station of said vacuum processing system;
f) transferring under vacuum said substrate with said cathode material to a second processing station within said vacuum processing system;
g) depositing a thin film of a solid electrolyte material onto said cathode material in said second processing station of said vacuum processing system;
h) transferring under vacuum said substrate with said solid electrolyte material to a third processing station within said vacuum processing system;
i) depositing a thin layer of anode material onto said solid electrolyte material in said third processing station of said vacuum processing system;
j) removing said substrate with said anode material from said vacuum processing system;
k) depositing an anode onto said anode material using a thick-film technique; and
l) depositing an anodic current collector onto said anode.

14. The method according to claim 13, whereby steps e), g) and/or i) are performed using one or more of the following techniques: sputtering, evaporation, chemical vapor deposition (CVD), plasma-enhanced chemical vapor deposition (PECVD), atomic layer deposition (ALD), pulsed laser deposition (PLD).

15. The method according to claim 13, whereby steps b), c) and/or k) are performed using one or more of the following techniques: screen printing, offset printing, inkjet printing, tape casting, thermal spraying, plasma spraying.

16. The method according to claim 13, whereby in step e) and/or i) and/or the thin film in step g) has a thickness of <10 micrometer.

* * * * *